United States Patent [19]

Metcalfe

[11] Patent Number: 4,936,609
[45] Date of Patent: Jun. 26, 1990

[54] CONNECTOR FOR PIPE JOINT

[76] Inventor: Paul V. Metcalfe, 3501 Oxmoor Industrial Blvd., Dothan, Ala. 36303

[21] Appl. No.: 392,511

[22] Filed: Aug. 11, 1989

[51] Int. Cl.⁵ .............................................. F16L 13/02
[52] U.S. Cl. .................................... 285/286; 285/81; 285/337
[58] Field of Search ................. 285/337, 81, 286, 256

[56] References Cited

U.S. PATENT DOCUMENTS

| | | | |
|---|---|---|---|
| 713,036 | 11/1902 | Wilmot | 285/356 X |
| 1,072,736 | 9/1913 | Kelly . | |
| 1,420,586 | 6/1922 | Spencer | 285/356 X |
| 2,101,894 | 12/1937 | Boughton | 285/337 X |
| 2,157,885 | 5/1939 | Bailey | 285/286 |
| 2,642,108 | 6/1953 | Geistert | 285/81 X |
| 2,832,615 | 4/1958 | Summers | 285/356 X |
| 2,954,797 | 10/1960 | Dryer | 285/356 X |
| 3,175,851 | 3/1965 | McMurray | 285/337 |
| 3,495,853 | 2/1970 | Furrer . | |
| 3,701,548 | 10/1972 | McGuire . | |
| 4,202,567 | 5/1980 | Paddington | 285/81 X |
| 4,610,471 | 9/1986 | Halen | 285/337 |
| 4,648,631 | 3/1987 | Bryant | 285/337 X |

Primary Examiner—Randolph A. Reese
Assistant Examiner—Carol I. Bordas
Attorney, Agent, or Firm—John L. Gray

[57] ABSTRACT

A connector for use in connecting a push-on mechanical bell-type pipe joint or butt-type joint together which comprises two legs positioned at right angles to each other, one of which may be welded to the surface of the male member and the other of which may be welded to the edge of the gland holding the gasket used in place, the leg attached to the male member being rotated so that the other leg being attached to the gland will readily engage the gland.

5 Claims, 2 Drawing Sheets

CONNECTOR FOR PIPE JOINT

BACKGROUND OF THE INVENTION

Cast ductile iron pipe which is used for water mains generally utilizes joints which are designed to seal but allow flexibility in the joint. These joints do not keep the pipe from separating longitudinally. The pipe will separate any time there is a change in direction of the water flow, if the pressure is changed in the case of a valve or a fire hydrant being turned off, or if there is a pressure surge caused by a pump being turned on. Most of the pipe used for this purpose is plain on one end and belled with a gasket on the other end and commonly called "push-on". The plain male member fits into the gasket which is placed inside the bell of the next member.

However, another type of joint that is also used for this purpose is referred to as a "mechanical joint", in this case a gland surrounds the male member adjacent the bell of the next female member and is so designed to have a portion that compresses the gasket tightly against the open end of the female member and the male member and is held in such pressing relationship usually by a series of bolts which bolt the gland to the female member.

Also on occasion it is necessary to butt together two male members and this is accomplished by surrounding them with a sleeve, which is considered to be a female member, and a gasket surrounds each male member adjacent the open end of the female member and then these two gaskets are pressed against the corresponding male and female members by means of bolts or tie-rods through the two glands which surround the male members and are adjacent to the open ends of the female member.

Approximately fifty percent of pipe six inches in diameter and below is made of plastic, usually polyvinylchloride, with the balance being ductile iron. For pipe from 8 inches in diameter up to 16 inches in diameter, the percentage of ductile iron increases. At above 16 inches in diameter no plastic pipe used.

In order to keep these types of pipe joints from separating various devices have been developed which usually employ tie-rods which are mechanically secured to the male member and the female member to hold them together in the case of a mechanical joint, or are secured to the two male members in the case of a butt joint. These are expensive and difficult to install in the field. In some cases they will slip and there are many cities that will not allow their use because in some cases they have bent to the point that the gasket has leaked.

Another technique that is used to hold these types of pipe joints together is to pour concrete around the joint. This is very expensive because of the cost of concrete and the labor involved. Also it is not possible readily to move or change the joint at a later date.

SUMMARY OF THE INVENTION

This invention involves the use of a fitting having two legs positioned at right angles to each other, one leg of which may be welded to the male member and the other leg of which is welded to the gland which is positioned adjacent to the female member. At least the leg which may be welded to the male member should be circular in diameter. One size of this fitting will fit all diameters of pipe. It is not possible to do this with the fittings that are now on the market. The leg of the fitting which is welded to the male member may be rotated as necessary prior to welding to insure that the other leg will be in contact with the gland. Thus, the other leg can be firmly attached thereto regardless of the actual space between the exterior of the male member and the interior of the gland. In smaller diameter pipe, only one fitting is necessary. As the diameter of the pipe increases, two fittings can be adequate, and in some cases three fittings spaced at 120 degrees around the pipe is all that will be necessary. In larger pipe, sixteen inches and above, more fittings are needed.

It is therefore, one object of this invention to provide a simple means for holding pipe joints in place.

It is a further object of this invention to provide such a fitting which may be positioned to secure such pipe joints together regardless of the diameter of the pipes.

These, together with other objects and advantages of the invention will become more readily apparent to those skilled in the art when the following general statements and descriptions are read in light of the appended drawings.

DETAILED DESCRIPTION OF THE INVENTION

Figure 1:
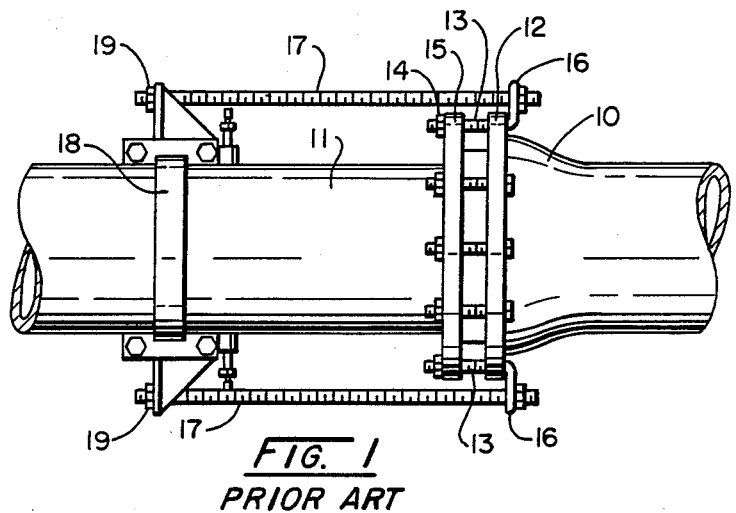
FIG. 1 illustrates a typical mechanical device of the prior art for holding a mechanical bell joint together.

Referring more particularly to FIG. 1 showing one version of the prior art, the female bell joint 10 is shown with the male member 11 inserted therein. The female member is provided with an upstanding portion 12 provided with circumferentially spaced holes adapted to receive a plurality of bolts 13—13 held in place by nuts 14—14. A gland 15 is provided which presses a gasket (not shown) against the male member and the interior of the female member. Attached to the portion 12 of the female member are two fittings 16—16 adapted to receive tie-rods 17—17 which in turn engage a mechanical sleeve shown generally at 18 which receives the tie-rods 17—17 and is secured by means of tightening the nuts 19—19 thus holding the joint in place.

Figure 2:
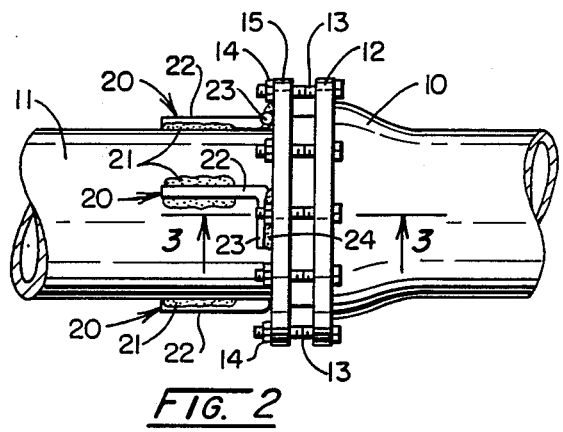
FIG. 2 is a side elevation view of a mechanical bell pipe joint showing applicants invention.

Referring now more particularly to FIG. 2, the female member of the bell joint 10 is shown with the male member 11 inserted therein with a gasket (which is not shown) surrounding the male member and positioned inside the female member. The gland 15 compresses the gasket and is held in place by means of bolts 13—13 and nuts 14—14. Connectors shown generally at 20—20 are attached to the male member 11 by weldments 21—21 firmly attaching one leg 22 which is preferably the longer leg of the connector 20 to the male member 11. The other leg 23 of the connector 20 is firmly attached to the gland 15 by means of weldments 24—24. Depending upon the diameter of the male and female members and the spacing between the gland and the exterior of the male member the longer leg 22 of the connector 20 may be rotated so that the shorter leg 23 is always in contact with the surface of the gland 15 to ensure a good strong welded joint. Thus, one size of connector 20 may be used to connect any diameter of cast ductile pipe regardless of the spacing of the gland 15 with respect to the male member 11.

Figure 3:
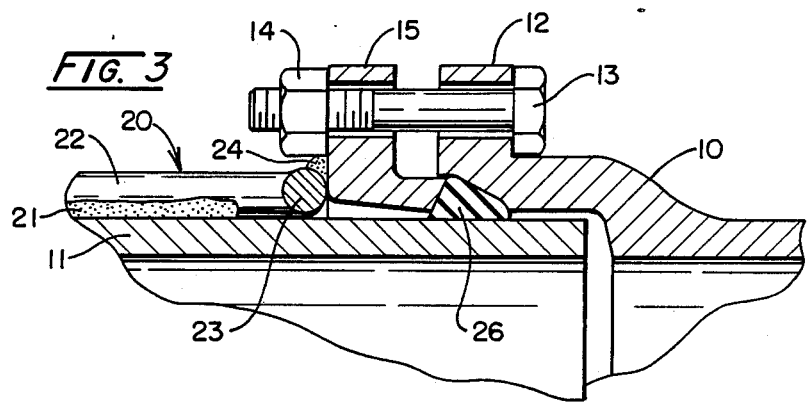
FIG. 3 is a Section of FIG. 2 on the Section 3—3.

Referring now more particularly to FIG. 3 which is a cross section on the section line 3—3 of FIG. 2, the gasket 26 is shown compressed between the surface of the male pipe member 11 and the interior of the female pipe member 10.

Figure 4:
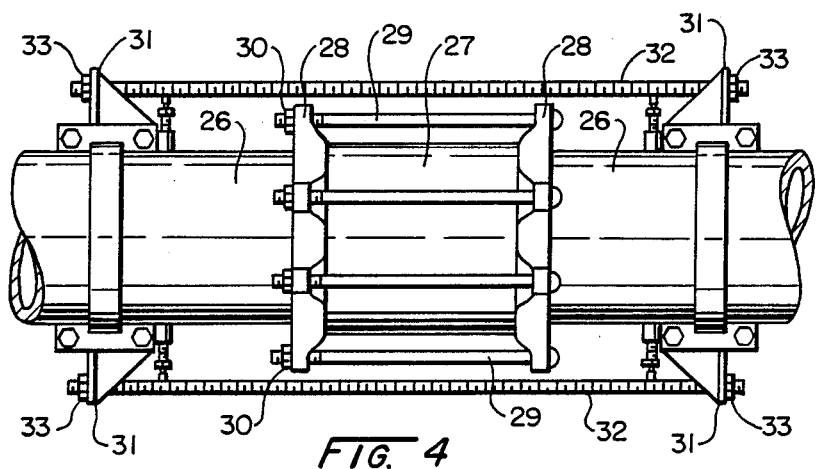
FIG. 4 illustrates a typical mechanical device of the prior art for holding a joint together where two male members have been butted together and surrounded by a female sleeve member with the appropriate glands and gaskets secured together.

Referring more particularly to FIG. 4, this shows two male pipe members 26—26 butted together in accordance with the prior art. Surrounding the two male pipes 26—26 which are butted together is a female sleeve 27 and positioned at each end of the interior of said female sleeve 27 and surrounding said male member 26 is a gasket (which is not shown) pressed against the male member 26 and the female sleeve 27 by means of glands 28—28 which are held together by means of a plurality of bolts 29—29 and nuts 30—30. Connected to the two male members are mechanical sleeves 31—31 connected to each other by means of tie-rods 32—32 held in place by nuts 33—33.

Figure 5:
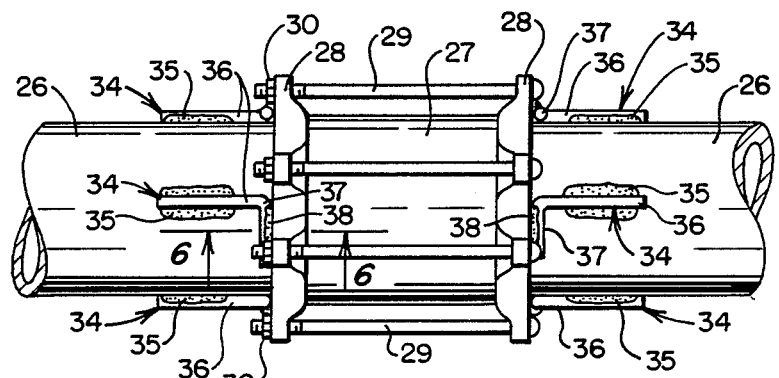
FIG. 5 is a side elevation view of such a joint showing applicant's invention.

Referring now more particularly to FIG. 5, the pipe joint is shown as described in the prior art without the mechanical sleeves 31—31 and tie-rods 32—32 and nuts 33—33. Instead, connectors shown generally at 34—34 are attached to the male members by weldments 35—35 firmly attaching one leg 36 to the male members 26—26. Preferably the longer leg 36 of the connector 34 is attached to the male member 26. The other leg 37 of the connector 34 is firmly attached to the edge of the glands 28—28 by means of weldments 38—38. The same advantages for this type of butt pipe joint in using this connector 34, of course, are enjoyed as are the advantages set forth above with respect to the pipe joints shown in FIGS. 2 and 3.

Figure 6:
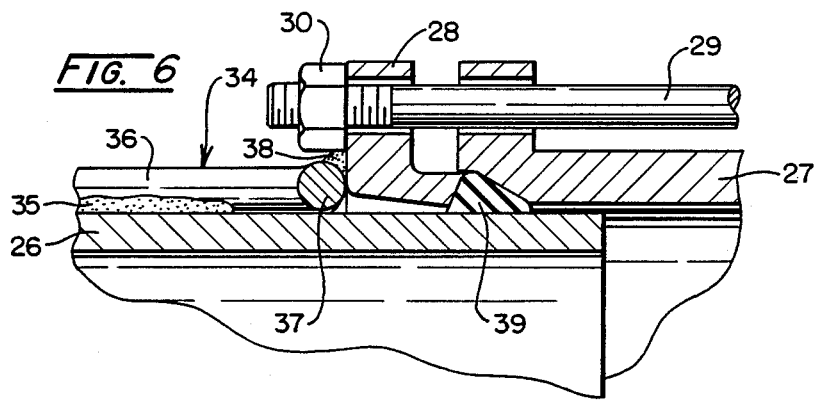
FIG. 6 is a section of FIG. 5 on the section 6—6.

Referring now more particularly to FIG. 6, the gasket 39 is shown compressed between the male member 26 and a portion of the female member 27 by means of the gland 28 held in place by means of the connectors 34—34. Preferably the connectors 20 and 34 have a diameter of approximately ⅜ of an inch with one leg being longer and approximately 5 inches long and the shorter leg being about 3 inches long. Preferably, the connectors are made of ASTM A242-81 metal, commonly called "COR-TEN ®", a registered trademark of USX.

The instant invention enables a secure joint to be achieved with a minimum of effort and will fit any diameter, metal, mechanical bell or male butt-type joint, regardless of the spacing between the interior diameter of the gasket and the exterior diameter of the male member. Furthermore, while the installation is permanent it can be readily be removed by cutting with a torch or a saw. The connectors 20 and 34 are installed after the pipe is assembled in the field and the installation involves a minimum of time and labor in assembling.

While this invention has been described in its preferred embodiment, it is to be appreciated that variations therefrom may be made without departing from the true scope and spirit of the invention.

What is claimed:

1. A pipe joint comprising:

a male member, a gasket surrounding said male member, a female member provided with an open end having an inside diameter greater than the outside diameter of said male member and surrounding said gasket and said male member, with said male member and said gasket inserted snugly into the open end of said female member, at least one gland completely surrounding said male member and provided with a portion adapted to compress said gasket against said male member and said female member, means for maintaining said portion of said gland adapted to press said gasket against said male member and said female member in a compressed condition, at least one connector having a first leg and a second leg disposed at right angles to each other, weldments for attaching said first leg to the exterior of said male member adjacent to said female member, said first leg having its longitudinal axis parallel to the longitudinal axis of said male member, and weldments for attaching said second leg to said gland.

2. The pipe joint of claim 1 wherein at least said first leg of said connector is circular in cross section.

3. The pipe joint of claim 1 wherein said first leg and said second leg of said connector are circular in cross section.

4. A connector for use in connecting a push-on pipe joint having a male member, a gasket surrounding said male member, a female member provided with an open end having an inside diameter greater than the outside diameter of said male member and surrounding said gasket and said male member, with said male member and said gasket inserted snugly in to the open end of said female member, and a gland completely surrounding said male member and provided with a portion adapted to compress said gasket against said male member and said female member, means for maintaining said portion of said gland adapted to press said gasket against said male member and said female member in a compressed condition, said connector comprising a first leg and a second leg disposed at right angles to each other, at least said first leg being circular in cross section and of a minimum diameter such that said first leg may be attached to the exterior of said male member adjacent to said gland with the longitudinal axis of said first leg parallel to the longitudinal axis of said male member and said second leg being of a length that it may be attached to said gland.

5. The connector of claim 4 wherein said connector is of a size, shape and made of a material whereby said first leg may be attached to said male member and said second leg may be attached to said gland by weldments.

* * * * *